US012194743B2

(12) United States Patent
Bueno Espinal et al.

(10) Patent No.: US 12,194,743 B2
(45) Date of Patent: Jan. 14, 2025

(54) UPWARDS JETTING DIGITAL PRINTING PLATFORM

(71) Applicant: Electronics for Imaging, Inc., Fremont, CA (US)

(72) Inventors: Eduardo Bueno Espinal, Almazora (ES); Juan Escudero Gonzalez, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

(21) Appl. No.: 18/311,863

(22) Filed: May 3, 2023

(65) Prior Publication Data

US 2023/0271418 A1 Aug. 31, 2023

Related U.S. Application Data

(63) Continuation of application No. 17/373,622, filed on Jul. 12, 2021, now Pat. No. 11,685,157.

(51) Int. Cl.

*B41J 2/04* (2006.01)
*B41J 2/07* (2006.01)

(Continued)

(52) U.S. Cl.

CPC .................. *B41J 2/07* (2013.01); *B41J 2/04* (2013.01); *B41J 2/1707* (2013.01); *B41J 3/407* (2013.01);

(Continued)

(58) Field of Classification Search

None

See application file for complete search history.

(56) References Cited

U.S. PATENT DOCUMENTS

| | | | |
|---|---|---|---|
| 4,814,795 | A | 3/1989 | Kuester et al. |
| 6,767,073 | B2 | 7/2004 | Tschida |
| 7,924,455 | B2 | 4/2011 | Lapstun et al. |
| 8,721,039 | B2 | 5/2014 | Jo |

(Continued)

FOREIGN PATENT DOCUMENTS

| | | | |
|---|---|---|---|
| CN | 114918081 | A | 8/2022 |
| EP | 1847381 | A1 | 10/2007 |

(Continued)

OTHER PUBLICATIONS

"Corrugated Box Printed Inside and Outside", Blog of Shanghai DE Printed Box; retrieved online from url: https://www.deprintedbox.com/blog/corrugated-box-printed-inside-and-out/; 13 pages, Jul. 4, 2016.

(Continued)

*Primary Examiner* — Scott A Richmond

(74) *Attorney, Agent, or Firm* — PERKINS COIE LLP

(57) ABSTRACT

A printing platform includes a printing engine with one or more printheads arranged such that the ink drops are jetted vertically upwards against the action of gravity; and a substrate transportation system where the normal to the surface in contact with the substrate is parallel and with opposite direction to the travelling direction of the jetted ink drops. It is necessary to counteract the weight of the substrate during the printing process to avoid it from falling under the action of gravity. This is achieved through any of a mechanical element that interferes with the falling of the substrate and that keeps it in place; or a system that generates adhesion forces between the element that transmits the motion to the substrate, typically a conveyor belt, and the substrate through the action of electrostatic forces, an air pressure differential between both faces of the substrate, or any other suitable mechanism.

18 Claims, 7 Drawing Sheets

(51) Int. Cl.

| | |
|---|---|
| ***B41J 2/17*** | (2006.01) |
| ***B41J 3/407*** | (2006.01) |
| ***B41J 3/60*** | (2006.01) |
| *B41J 2/14* | (2006.01) |

(52) U.S. Cl.

CPC .......... *B41J 3/60* (2013.01); *B41J 2002/1437* (2013.01); *B41J 2202/11* (2013.01)

(56) References Cited

U.S. PATENT DOCUMENTS

| | | | |
|---|---|---|---|
| 2002/0033860 A1 | 3/2002 | Kubota et al. | |
| 2007/0247505 A1 | 10/2007 | Isowa et al. | |
| 2018/0200906 A1 | 7/2018 | Senoo | |
| 2018/0297356 A1* | 10/2018 | Capoia | B41J 13/0063 |
| 2020/0114655 A1 | 4/2020 | Escudero Gonzalez et al. | |
| 2021/0222025 A1 | 7/2021 | Okazaki et al. | |

FOREIGN PATENT DOCUMENTS

| | | |
|---|---|---|
| EP | 3121017 B1 | 11/2019 |
| EP | 3442805 B1 | 9/2020 |
| JP | 2019162768 A | 9/2019 |
| WO | 2020152531 A3 | 9/2020 |

OTHER PUBLICATIONS

"Technical Documents of Corrugated Box Making Machines", Hebei Shengli Carton Equipment Manufacturing Co., Ltd.; retrieved online on Jun. 21, 2021 from url: www.corrugated-box-machine-china.top/technology-of-corrugated-box-mking-machines; publication date unknown, 5 pages.

"V5 Upjet prints on the back of large format pieces to mark industrially and improve production traceability.", Limitronic; retrieved online from url: https://www.limitronic.com/en/printer/industrial-printer-v5-upjet, Jan. 2020, 1 page.

Der Nederlanden, Leopold , "What is flexo printing? The printing technique explained", MPS Printing Productivity; retrieved online from url: https://blog.mps4u.com/what-is-flexo-printing, Aug. 7, 2018, 4 pages.

Murat, Akar , "#projectainvent", retrieved online from url: https://www.linkedin.com/posts/murat-akar-94309367_projectainvent-digital-seiko-activity-6787419204564852737-u8vZ, Apr. 2021, 4 pages.

* cited by examiner

UPWARDS JETTING DIGITAL PRINTING PLATFORM

CROSS-REFERENCE TO RELATED APPLICATION(S)

This application is a continuation of U.S. patent application Ser. No. 17/373,622, titled "UPWARDS JETTING DIGITAL PRINTING PLATFORM" and filed on Jul. 12, 2021, which is incorporated herein by reference in its entirety.

TECHNICAL FIELD

Various of the disclosed embodiments concern an upwards jetting digital printing platform.

BACKGROUND

In the sector of industrial digital inkjet printing for non-flexible flat substrates, most machines have a similar morphology. This basic architecture typically includes:

1) A conveyor belt transport for the transportation of the substrate to be printed located in the lower region of the machine; and
2) A structure in the upper region of the machine where the printheads that deposit the ink on the substrate are located.

In this typical arrangement, the normal to the face of the substrate to be printed is parallel and with the same direction as the upwards vertical direction and the drops of ink fall in the same direction as that of gravity.

This arrangement has obvious benefits for the simplicity and robustness of the system:

1) The weight of the substrate is supported by the conveyor belt and the support table, if present;
2) The printheads are less prone to be contaminated by suspended particles in the air as they would fall under the action of gravity; and
3) The maintenance operations carried out on the printheads, such as cleaning, purging, and priming are simplified under the action of gravity.

Nevertheless, in some specific cases this arrangement is not preferred, for example when it is desirable to minimize and simplify the required processes for the printing to be conducted. One of these cases is the printing of the bottom/back face of the substrate.

SUMMARY

Embodiments of the invention allow the seamless integration of digital printing platforms into production lines where the substrate to be printed is typically upside down, with the normal to the surface to be printed having the same direction as that of the acceleration of gravity. This eliminates additional steps of the production process, resulting in lower cost, faster return on investment, more compact production lines, and higher productivity.

Embodiments of the herein disclosed printing platform include:

1) A printing engine with one or more printheads arranged in such a way that the ink drops are jetted vertically upwards against the action of gravity; and
2) A substrate transportation system where the normal to the surface in contact with the substrate is parallel to and with an opposite direction to the travelling direction of the jetted ink drops.

DETAILED DESCRIPTION

Embodiments of the invention allow the seamless integration of digital printing platforms into production lines where the substrate to be printed is typically upside down, with the normal to the surface to be printed having the same direction as that of the acceleration of gravity. This eliminates additional steps of the production process, resulting in lower cost, faster return on investment, more compact production lines, and higher productivity.

Embodiments find application with any rigid substrate that is to be printed upside down, where ink is to be jetted upwardly to the substrate. While the discussion herein primarily concerns corrugated cardboard substrates, those skilled in the art will appreciate that embodiments of the invention find ready application for such substrates as paper, non-corrugated cardboard, fiberboard, Masonite, PVC, acrylic, poly carbonate and other rigid plastic sheets, foam core, sheetrock, plywood, etc.

Figure 1:
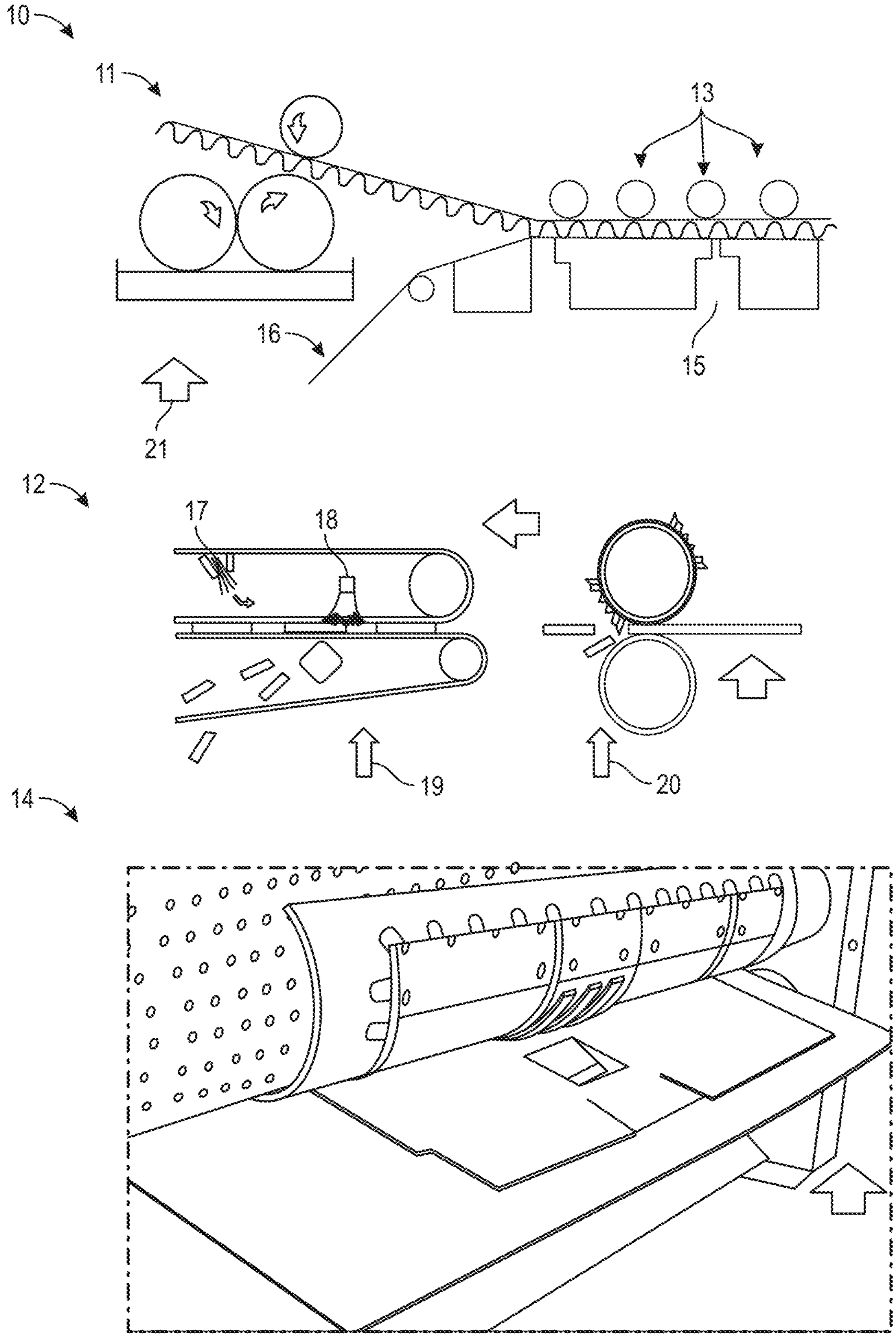
FIGURE 1 (PRIOR ART)
FIG. 1 is a process diagram that shows a cardboard box fabrication line.

FIG. 1 is a process diagram that shows a cardboard box fabrication line.

In FIG. 1, a corrugator 10 assembles a single face portion 11 of a corrugated cardboard sheet with an external liner portion 16 of the corrugated cardboard sheet at a hot table 15 by use of pressure rollers 13. The external liner, which is downward facing provides the printing face 21 for the resulting corrugated sheet.

The printing surface is downward facing to protect against the accumulation of dust and dirt before the surface is printed. Also, the die cutting process, as well as folding, must be performed from the unprinted surface for reasons of efficiency and further to avoid engagement of the cutter template or folding arms with the printed surface, which may damage any image printed on that surface. Thus, it is desirable to maintain the printed surface in a downward orientation during such fabrication steps as die cutting and folding. To accommodate this requirement, printing is typically performed by flipping and rotating the cardboard sheets prior to printing and then reflipping and re-rotating the cardboard sheets after printing and prior to die cutting and folding. The printing step is discussed in greater detail below in connection with FIG. 2.

The corrugated cardboard sheet is passed to a stripping station 12 where it is stripped 20 into individual sheets and then cleaned 19 by brushing 18 and blowing 17 operations.

The individual sheets are then passed to a die cutter 14 where they are cut as appropriate to produce a cut sheet that can be folded into a corrugated cardboard box.

Figure 2:
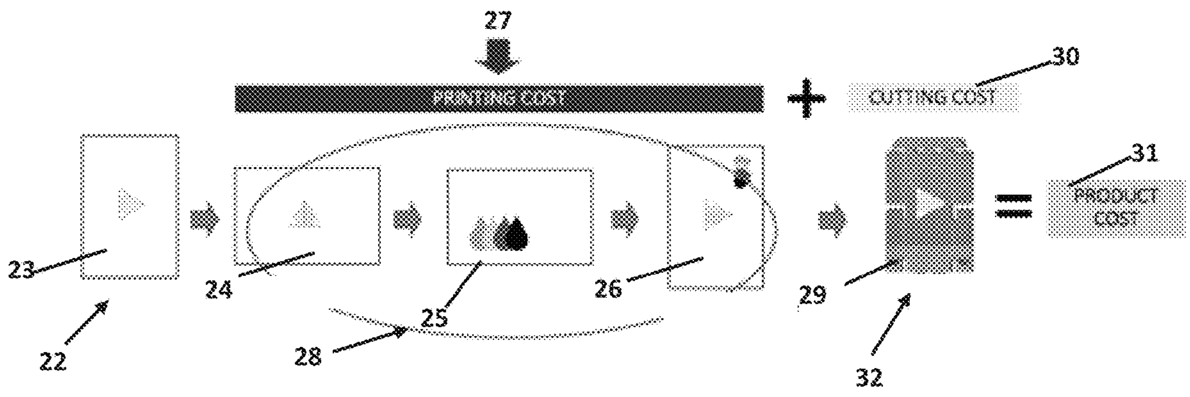
FIGURE 2 (PRIOR ART)
FIG. 2 is a process diagram that shows a digital printer integrated into a carboard box fabrication line.

FIG. 2 is a process diagram that shows a digital printer integrated into a carboard fabrication line. Most common cardboard fabrication lines use lithographic or flexographic printing techniques. However, these techniques are limited by stencils or die that are fabricated by a process that is both time consuming and expensive. Additionally, such stencils or die have a limited useful life. Further, lithographic or flexographic techniques apply colors separately, which is time consuming because each color separation must be printed sequentially. Hence, the modern trend is to use digital printers which can print any image faithfully any number of times without the need for stencils or die, and with which all color separations are printed simultaneously through the use of ink jet printheads.

In FIG. 2, a corrugator 22 produces individual carboard sheets 23 as described in connection with FIG. 1 above. The individual sheets are then presented to a printing station 28. Because the printing surface of the cardboard sheet is the downward facing surface of the cardboard sheet, the sheet must be rotated and flipped 24 before it can be printed with a conventional digital printer 25 that jets ink downward. After printing, the individual sheets are again rotated and flipped 26 and then conveyed to a die cutting station 32 where they are cut as appropriate to produce a cut sheet 29 that can be formed into a corrugated cardboard box.

As can be seen with the use of conventional digital printing techniques in a corrugated cardboard fabrication line, the product cost 31 is the sum total of the printing cost 27 and the cutting cost 30. The time taken to manipulate the cardboard sheets prior to and after printing is a significant cost factor in the production of corrugated cardboard sheet using this technique.

Figure 3:
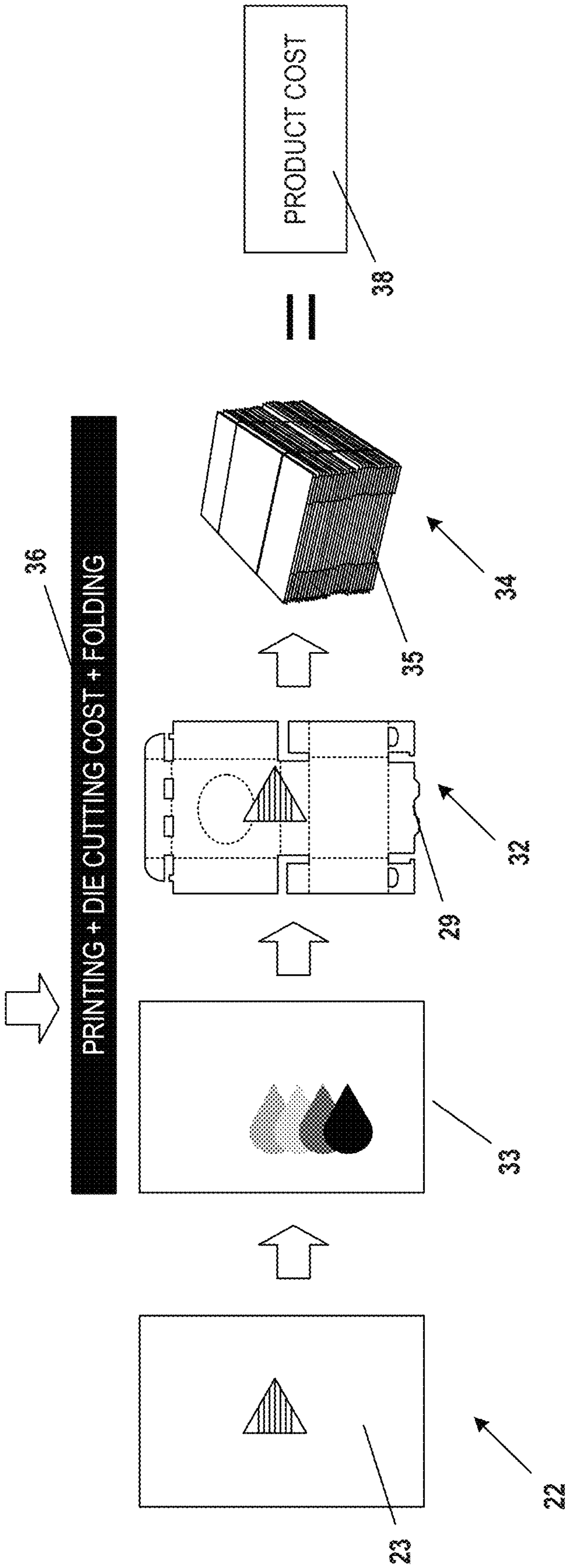
FIG. 3 is a process diagram that shows a digital printer integrated into a carboard box fabrication line according to the invention.

FIG. 3 is a process diagram that shows a digital printer integrated into a carboard box fabrication line according to the invention.

In FIG. 3, a corrugator 22 produces individual carboard sheets 23. The individual sheets are then presented to a printing station 33. Here, the printing surface of the cardboard sheet is the downward facing surface of the cardboard sheet but the sheet is not rotated and flipped because it is printed with a digital printer 25 that jets ink upwardly. After printing, the individual sheets are conveyed to a die cutting station 32 where they are cut as appropriate to produce a cut sheet 29 that is then conveyed to a folding station 34 where the folded cut corrugated sheets 35 are stacked and bound.

As can be seen with the use of an upward jetting digital printing techniques in a corrugated cardboard fabrication line, the product cost 38 is the sum total of the printing, die cutting, and folding cost 38. This cost is substantially less than the cost of corrugated cardboard fabrication using conventional digital printing techniques. Because the printer jets ink upwardly it is not necessary to interrupt the flow of cardboard sheets to rotate and flip the cardboard sheets before they are printed, nor is it necessary that the cardboard sheets be again rotated and flipped after printing and before die cutting.

Figure 4:
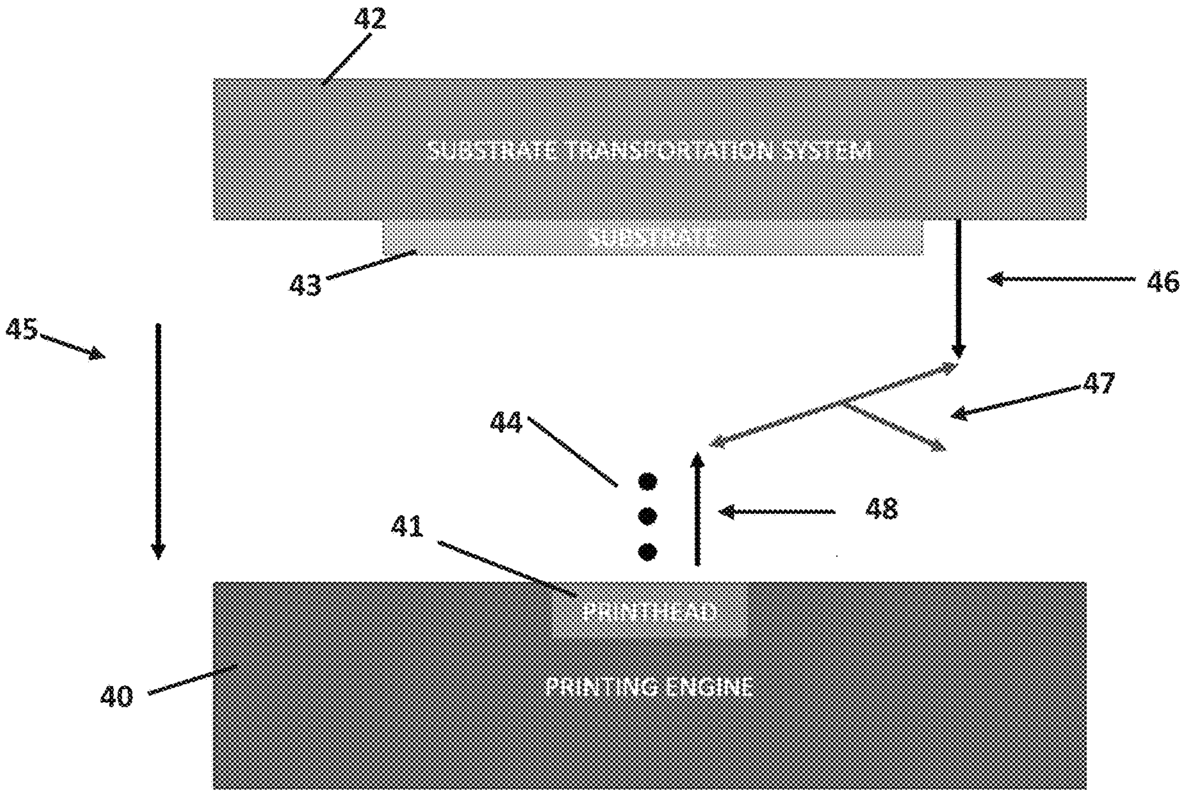
FIG. 4 is a schematic representation of an upwards jetting digital printing platform according to the invention.

FIG. 4 is a schematic representation of an upwards jetting digital printing platform according to the invention.

Embodiments of the herein disclosed printing platform include:

1) A printing engine with one or more printheads arranged in such a way that the ink drops are jetted vertically upwards against the action of gravity; and
2) A substrate transportation system where the normal to the surface in contact with the substrate is parallel and with opposite direction to the travelling direction of the jetted ink drops.

In FIG. 4, a substrate 43 is conveyed by a substrate transportation system 42 past a printhead 41. The upward travelling direction 48 of the ink drops 44 means that the ink drops must overcome the force of downward acceleration due to the effect of gravity 45.

The printhead is normal 46 to the surface of the transportation system that is in contact with the substrate. The printhead is controlled by a printing engine 40 to jet the ink drops upwardly to the substrate as it passes the printhead. The surface of the substrate transportation system that is in contact with the substrate is parallel with and in the opposite direction to the travelling direction 47 of the jetted ink drops.

In embodiments of the invention, two main modifications are introduced to the printer with respect to a typical arrangement where the ink drops are jetted downwards and the substrate is resting on top of the substrate transportation system.

These are:

1) A system to convey the substrate safely and avoid it from falling under the action of gravity; and
2) An adaptation of the printhead, ink delivery system operating conditions, and substrate properties to ensure that the drop ejection process and deposition takes place correctly against the action of gravity.

Regarding the conveying of the substrates under the action of gravity, the counteracting of the weight of the substrate during the printing process can be achieved through different mechanisms, two of which are:

1) Including a mechanical element such as lateral strip guides that interfere with the falling of the substrate and that keep the substrate in contact against the substrate transportation system; and
2) Integrating a system that generates adhesion forces between the element that transmits the motion to the substrate, typically a conveyor belt, and the substrate through the action of electrostatic forces, an air pressure differential between both faces of the substrate, or any other such mechanism.

Figure 5A:
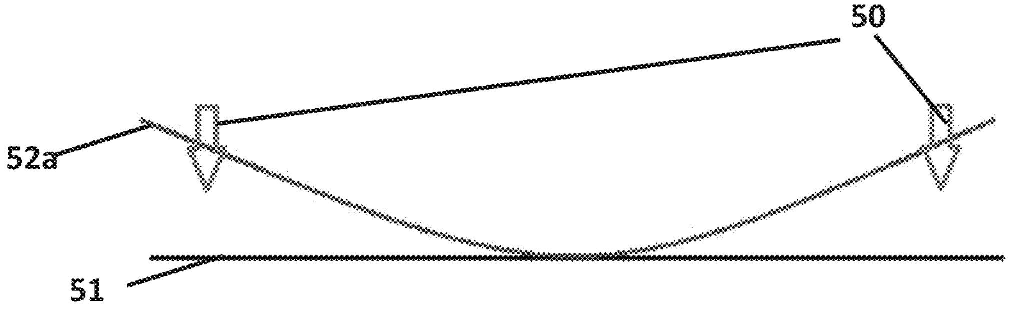
FIG. 5A shows a conventional printing arrangement in which the action of gravity reduces substrate warpage.

FIG. 5A shows a conventional printing arrangement in which the action of gravity reduces substrate warpage.

In FIG. 5A, a substrate 52*a* is subject to the force of gravity 50, such that it is pressed in a printing plane 51.

Figure 5B:
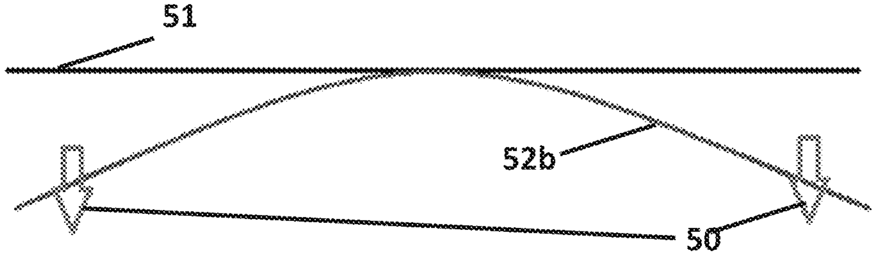
FIG. 5B shows how the action of gravity increases substrate warp in a printing arrangement according to the invention.

FIG. 5B shows how the action of gravity increases substrate warp in a printing arrangement according to the invention.

In FIG. 5B, a substrate 52*b* is subject to the force of gravity 50, such that it is pulled downwardly from a printing plane 51.

Irrespectively of the method employed to hold the substrate in place, the adhesion force between the substrate and the conveying element should be superior than in the traditional arrangement. Besides the fact that the weight of the substrate should be counteracted by the substrate holding mechanism, this is also related to the effect of gravity on warped substrates. For the most common concave-warped substrates, looking from the printhead side, the action of gravity in the traditional printer arrangement helps to flatten the substrate while, for the proposed arrangement, the action of gravity tends to amplify the degree of warp of the substrate. In summary, for most cases, in the proposed arrangement the integral across the substrate area of the pressure difference between the top and bottom faces should be higher by at least the substrate weight than in the traditional arrangement.

Regarding the drop ejection against the action of gravity, four main aspects should be considered:

1) The impact of gravity on the resting conditions of the ink at the printhead nozzles, also called the ink meniscus;
2) The effect of the gravity on the drop formation;
3) The effect of the gravity on the trajectory of the flying ink drops; and
4) The interaction between the ink drops and the substrate upon landing.

These aspects can be tailored for the specific requirements of this printing arrangement by tuning three main elements 1) The ink delivery system setpoints that set the ink temperature and viscosity, the pressure within the printheads, and the flow rate across them;
2) The driving voltage signal, also called waveform, that excites the actuators, typically piezoelectric, that cause the drop ejection to happen; and
3) The surface properties of the substrate, mainly related to its free energy, the surface/ink interfacial free energy, and its porosity.

Figure 6A:
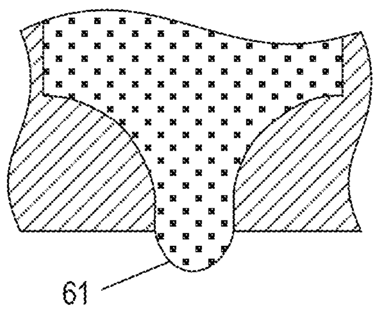
FIGURE 6A (PRIOR ART)
FIG. 6A shows a typical ink meniscus in a conventional printing arrangement.

FIG. 6A shows a typical ink meniscus in a conventional printing arrangement. In FIG. 6A, the meniscus 61 is convex in shape.

Figure 6B:
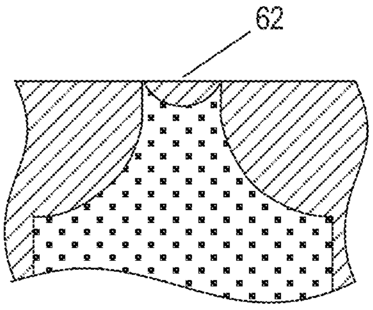
FIG. 6B shows an ink meniscus in an upward printing arrangement.

FIG. 6B shows an ink meniscus in an upward printing arrangement. In FIG. 6B, due to the force of gravity, the meniscus 62 is concave in shape.

Regarding the first aspect, the ink meniscus shape is affected by multiple factors such as the ink pressure at the nozzle, the surface tension and density of the ink, the nozzle shape, the surface energy of the nozzle plate material, and the orientation of the printheads with respect to gravity. This shape has severe implications for the printhead operation because it affects ink laydown, long-term printing robustness, and accurate image reproduction. Embodiments achieve the same optimal meniscus shape as the typical arrangement (FIG. 6A) by modifying the ink pressure at the meniscus, as shown below, because this parameter is typically the most easily tunable through the control of the ink delivery system as opposed to the other mentioned factors that depend on inherent material properties and that are more difficult to modify. This pressure can be approximately estimated from the average of the ink pressures at the inlet and outlet ports of the printhead, $$P_{meniscuc} = \frac{P_{intlet} + P_{outlet}}{2}.$$

While for the typical arrangement the ink at the meniscus is kept under slight vacuum, i.e., ink pressure is slightly below atmospheric one, to counteract gravity and prevent drops from falling (dripping), in embodiments the ink delivery system setpoints are modified in such a way that the pressure at the meniscus is slightly above atmospheric one, thereby counteracting the effect of gravity and ensuring optimal meniscus shape for drop formation. This can be accomplished by increasing both the inlet and outlet printhead pressures while keeping the difference between them stable so as not to affect the flow rate across it. This optimal meniscus shape can be deduced based on printing tests where this and other parameters, such as the waveform, are modified to achieve the best possible balance between opposing requirements, such as maximizing drop volume and velocity and minimizing nozzle plate and substrate contamination. The required increase in meniscus pressure between both arrangements is highly dependent on the parameters previously cited but is in the range of 3 to 10 kPa for most cases.

Figure 6C:
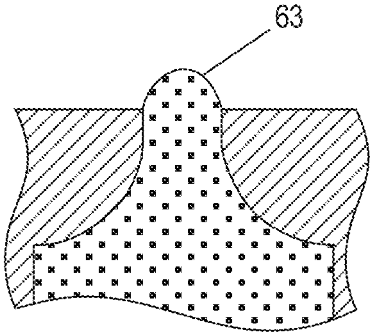
FIG. 6C shows an ink meniscus in an upward printing arrangement where the pressure at the meniscus is adjusted according to the invention to have an equivalent meniscus shape as in the conventional printing arrangement of FIG. 6A.

FIG. 6C shows an ink meniscus in an upward printing arrangement where the pressure at the meniscus is adjusted according to the invention to have an equivalent meniscus shape as in the conventional printing arrangement of FIG. 6A. In FIG. 6C, the meniscus 63 is convex in shape.

Regarding the second aspect, this adaptation can be accomplished by a combination of a modification in the ink properties, particularly the ink viscosity through ink heating/cooling, and the waveform. The waveform is a highly tunable element of inkjet printing system so adaptation to the specific requirements of this arrangement would not have major side effects, contrary to the change in the ink properties where this can lead to undesired ink evaporation and degradation, so the adaptation of this factor is preferred. The procedure to tune a waveform is typically performed entirely in an experimental set-up involving printing in front of a stroboscopic camera where parameters such as the drop volume and velocity can be measured under variable drop ejection frequencies, and also printing on a substrate to check contamination and drop placement accuracy. In these set-up, parameters such as the voltage levels, the duration of the voltage pulses, and the spacing between the pulses is changed to achieve the desired drop characteristics and long-term jetting sustainability. In embodiments, it is important to achieve similar volume and velocities of the jetted drops as the optimal ones for the typical arrangement and prevent long term jetting sustainability problems. The drop ejection against the action of gravity should lead, in most cases, to slightly higher required power/voltage levels, typically 2 to 20%, than in the typical arrangement due to gravity acting against the drop detachment from the ink ligament generated by the action of printhead actuator.

Regarding the third aspect, once the ink drop has already exited the printhead nozzle, it can be shown that gravity has minimal impact on the drop trajectory. This is related to the fact that the ink drops exit the printhead nozzle at relatively high speeds, typically between 5 and 15 m/s, so the dominant force acting on the falling drops is caused by drag against the surrounding air, which can be orders of magnitude bigger than the force of gravity for these very small drops, which are on the order of 10 to 100 microns in diameter.

Finally, regarding the fourth aspect, gravity plays a role in the interaction between the falling drop and the substrate upon contact. Due to the negligible impact on the trajectory and velocity of the drops previously discussed, the herein disclosed arrangement should not lead in most cases to more significant splashing with respect to the traditional approach. Nevertheless, the dynamic process of ink settling on the substrate is affected by the action of the gravity. In embodiments, and for the same conditions as for the traditional ones, slower ink drop absorption and diameter increase on the substrate can be expected, leading to slower drop gain. As previously mentioned, this behavior can be compensated by playing with the surface properties of the substrate, for example, by applying a primer agent that increase the surface energy and modify the porosity of the ink-receiving surface over the one used in the typical arrangement to enhance its wettability and optimize drop control. The specific requirements are very substrate-specific. For example, for porous substrates, such as cardboard, a slower ink absorption of this arrangement is preferred because it leads to better drop and image definition. Thus, no specific adaptation of the primer properties for the proposed arrangement is required, although an improvement over the performance achieved with the conventional arrangement is possible. For drop gain control, the goal is to increase the drop size to a level where possible defects in the drop deposition are masked and the desired color density is achieved. This is typically accomplished when, for the biggest drop, the final diameter on the substrate is in between $\sqrt{2}$ and 2 times the spacing between adjacent nozzles. The methods to achieve this can include chemical and electrical treatments of the surface to be printed and the formulation of primers to be applied on the surface to be printed before the printing takes place.

This arrangement is applicable for any application where the face of the substrate to be printed is typically facing downwards due to optimality for other steps of the manufacturing process. This adaptation to the other steps of the process allows the number of total operations required for the production of the substrate to be reduced, resulting in lower production costs.

One possible application is the printing of corrugated cardboard sheets, where the manufacturing of the sheets takes place with the surface to be printed facing downwards. This arrangement would also allow the printing of both sides of the substrate in a completely consecutive manner without requiring any intermediate substrate flipping procedure by concatenating one printing machine having a traditional downward jetting arrangement and another having the disclosed upward jetting arrangement or vice versa.

Figure 7A:
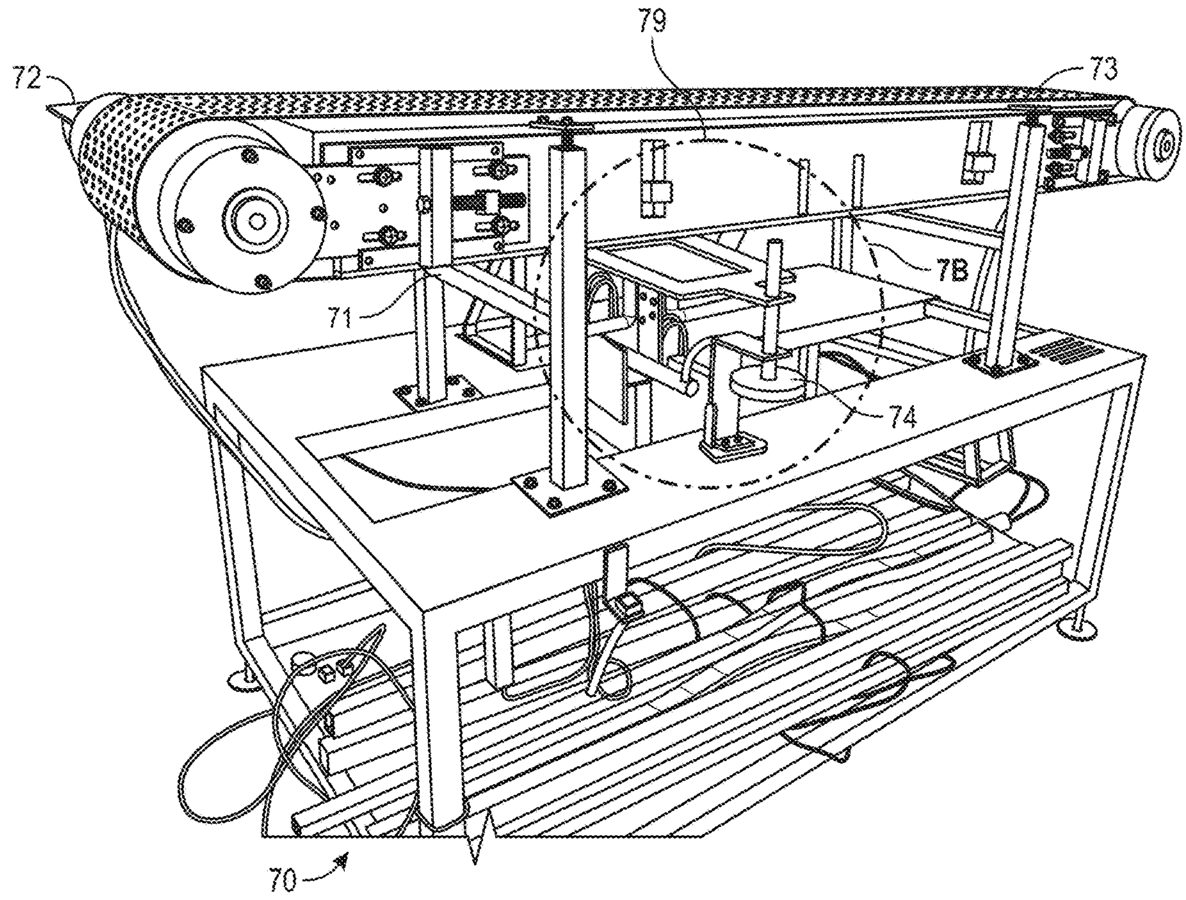
FIG. 7A is a perspective view of an upward printing digital printer.

FIG. 7A is a perspective view of an upward printing digital printer.

Figure 7B:
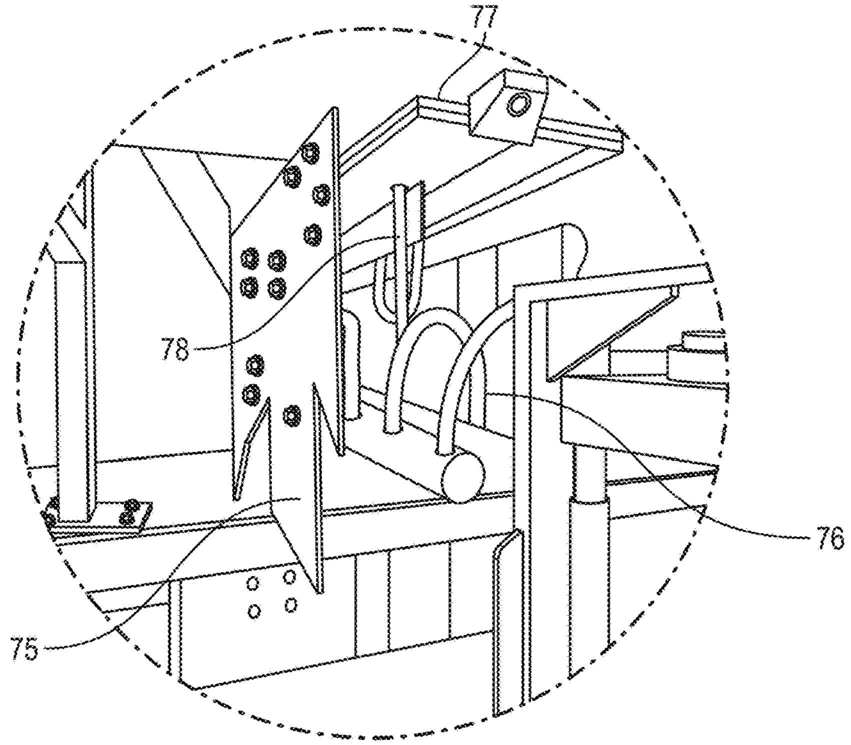
FIG. 7B is detailed view showing the printing mechanism of the printer of FIG. 7A according to the invention.

In FIG. 7A, a printer 70 includes a belt 73 that, in combination with a drive force supplied by an engine 72, conveys cardboard sheets (not shown) past the printheads (78, see FIG. 7B). In this embodiment, a vacuum 71 is applied to the belt to retain the cardboard sheets thereto while suspended from the belt during conveyance past the print heads and thus also maintain planarity of the cardboard sheets during printing thereon. In other embodiments, an electrostatic charge, mechanical retainer, or other mechanisms, or combinations thereof, may be used to hold the cardboard sheets to the belt.

The spacing of the printheads to the cardboard sheets is adjustable by use of a manual lifting system 74. The distance of the substrate to the printhead should be sufficient to prevent possible contact between irregularities of the printed face of the substrate and the printheads while also being as small as possible to minimize possible drop deviations induced by air flow and drop deceleration.

FIG. 7B is detailed view of the printer of FIG. 7A.

In FIG. 7B, a portion 79 of the printer 70 is shown in greater detail. A printhead 78 and jet plate 77 are arranged such that ink is jetted upwardly towards the cardboard sheets. Ink is supplied to the printhead by an ink delivery system 76. The printhead nozzles are controlled by an electronics assembly 75.

Those skilled in the art will appreciate that the printheads and electronic controls therefore may be selected from among those that are currently available to conduct the required adaptations previously described for optimal operation in the proposed arrangement.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:

1. A platform designed for digital printing, the platform comprising:

a transportation system that is configured to convey a sheet such that a surface of the sheet on which ink is deposited faces downward against gravity; and a print engine with a printhead that is arranged to jet the ink upwards, through a nozzle, toward the surface of the sheet to form an image;

wherein pressure of the ink at the nozzle is above one atmosphere, such that a meniscus has a convex shape that extends beyond the nozzle.

2. The platform of claim 1, wherein to ensure that jetting of the ink takes place against gravity, a modification is made to the printhead or to an operating condition of the print engine.

3. The platform of claim 2, wherein the modification is an adjustment of ink temperature, ink viscosity, pressure within the printhead, or flow rate of the printhead.

4. The platform of claim 2, wherein the modification is an adjustment of a driving voltage signal that excites an actuator to effect ejection of droplets of the ink.

5. The platform of claim 1, further comprising:

a fabricator that is configured to produce individual sheets having a downward-facing surface on which to print and provide the sheets to the transportation system.

6. The platform of claim 1, further comprising:

a mechanism that is configured to counteract weight of the sheet during conveyance by the transportation system.

7. The platform of claim 6, wherein the mechanism is a mechanical element that inhibits falling of the sheet to keep the sheet in contact against a conveyance member of the transportation system.

8. The platform of claim 6, wherein the mechanism is an adhesion element that promotes adhesion of the sheet to a conveyance member of the transportation system, through action of either electrostatic force or air pressure.

9. A printer for printing against gravity, the printer comprising:

a print engine that includes a printhead arranged to jet ink vertically upwards through a nozzle toward a downward-facing surface of a sheet in droplet form; and a transportation system that is configured to convey the sheet past the print engine, wherein the transportation system includes a mechanism that is configured to counteract a weight of the sheet through an application of pressure, and wherein an integral across the sheet of a first difference in pressure between the downward-facing surface and an upward-facing surface while the sheet is conveyed past the print engine is higher than a second difference in pressure between the downward-facing surface and the upward-facing surface while the sheet is laid with the downward-facing surface against a surface.

10. The printer of claim 9, wherein the first difference in pressure is higher than the second difference in pressure by at least the weight of the sheet.

11. The printer of claim 9, wherein pressure of the ink is maintained above one atmosphere, such that a meniscus has a convex shape that extends beyond the nozzle.

12. The printer of claim 11, wherein the pressure of the ink is in a range of 3 to 10 kPa.

13. The printer of claim 11, wherein to maintain the pressure of the ink above one atmosphere, inlet and outlet pressures of the printhead are increased while a difference between the inlet and outlet pressures is kept stable.

14. The printer of claim 9, wherein to ensure that jetting of the ink takes place against gravity, a modification is made to the printhead or to an operating condition of the print engine.

15. The printer of claim 14, wherein the modification is a change in viscosity of the ink through heating or cooling prior to ejection through the nozzle.

16. The printer of claim 14, wherein the modification is an adjustment of a driving voltage signal that excites an actuator to effect ejection of droplets of the ink, and wherein as part of an experimental setup, a procedure to tune the driving voltage signal is performed in which parameters are varied to achieve a desired drop characteristic.

17. The printer of claim 16, wherein the parameters include voltage level, voltage pulse duration, and voltage pulse spacing.

18. The printer of claim 9, wherein the droplets are ejected from the nozzle of the printhead at a speed in a range of 5 to 15 m/s.

* * * * *